United States Patent [19]

Nishigaki

[11] Patent Number: 5,341,316
[45] Date of Patent: Aug. 23, 1994

[54] PERSONAL COMPUTER SYSTEM ALLOWING SELECTIVE USE OF BUILT-IN AND EXTERNAL KEYBOARDS BY MEANS OF SELECTOR

[75] Inventor: Nobutaka Nishigaki, Fussa, Japan

[73] Assignee: Kabushiki Kaisha Toshiba, Kawasaki, Japan

[21] Appl. No.: 33,971

[22] Filed: Mar. 19, 1993

Related U.S. Application Data

[63] Continuation of Ser. No. 552,055, Jul. 13, 1990, abandoned.

[30] Foreign Application Priority Data

Sep. 8, 1989 [JP]  Japan ................................. 1-233420

[51] Int. Cl.⁵ ............................................. G06F 3/00
[52] U.S. Cl. ............................................. 364/709.12
[58] Field of Search ........................ 364/709.12, 709.13, 364/709.14, 709.15, 709.16, 709.01, 709.10, 705.01; 340/717, 149 A; 235/61.7 B, 379

[56] References Cited

U.S. PATENT DOCUMENTS

| | | | |
|---|---|---|---|
| 3,956,615 | 5/1976 | Anderson et al. | 235/61.7 B |
| 3,973,256 | 8/1976 | Stoesser et al. | 340/365 E |
| 4,064,560 | 12/1977 | Baxter | 364/900 |
| 4,068,213 | 1/1978 | Nakamura et al. | 340/149 A |
| 4,237,535 | 12/1980 | Wiedenman | 364/200 |
| 4,360,870 | 11/1982 | McVey | 364/200 |
| 4,458,307 | 7/1984 | McAnlis et al. | 364/200 |
| 4,458,357 | 7/1984 | Weymouth et al. | 377/2 |
| 4,485,437 | 11/1984 | Kinghorn | 364/200 |
| 4,492,582 | 1/1985 | Chang et al. | 434/169 |
| 4,532,416 | 7/1985 | Berstein | 235/379 |
| 4,575,714 | 3/1986 | Rummel | 340/568 |
| 4,638,422 | 1/1987 | Rees | 364/200 |
| 4,642,761 | 2/1987 | Yanagiuchi et al. | 364/200 |
| 4,654,818 | 3/1987 | Wetterau, Jr. | 364/709.12 |
| 4,965,560 | 10/1990 | Riley | 340/717 |
| 5,133,076 | 7/1992 | Hawkins et al. | 364/709.09 |

FOREIGN PATENT DOCUMENTS

| | | |
|---|---|---|
| 0326102 | 8/1989 | European Pat. Off. . |
| 62-274326 | 11/1987 | Japan . |
| 64-59524 | 7/1989 | Japan . |
| 2174261A | 10/1986 | United Kingdom . |

OTHER PUBLICATIONS

Rothhaupt, T., Elektronik No. 13, pp. 102–104 (Jun. 26, 1987) Munchen, W. Germany.
"Technical Reference", IBM Personal Computer Hardware Reference Library, Mar. 1984.
"Reference Manual", Toshiba T3200 Portable Personal Computer, 1987.
"Reference Manual", Toshiba T3200SX Portable Personal Computer, Jul. 1989.

Primary Examiner—Long T. Nguyen
Attorney, Agent, or Firm—Finnegan, Henderson, Farabow, Garrett & Dunner

[57] ABSTRACT

A computer system includes a main body, an integral keyboard formed in the main body, a CPU for executing various types of data processing, a connector through which an external keyboard can be connected to the main body, and a keyboard controller, controlled by the CPU, for receiving key code data supplied from the integral keyboard and transmitting the received key code data to the CPU. The computer system also includes a selector which selects either the integral keyboard or the connector, on the basis of the contents of the data stored in a register, and connects the selected keyboard to the keyboard controller.

20 Claims, 6 Drawing Sheets

F I G. 7

PERSONAL COMPUTER SYSTEM ALLOWING SELECTIVE USE OF BUILT-IN AND EXTERNAL KEYBOARDS BY MEANS OF SELECTOR

This application is a continuation, of application Ser. No. 07/552,055 filed Jul. 13, 1990, now abandoned.

BACKGROUND OF THE INVENTION

1. Field of the Invention

The present invention relates generally to a personal computer which allows selective use of an integrally-provided keyboard and an optionally-connectable external keyboard, and more particularly to a personal computer which is improved such that the integral and external keyboards can both be controlled by use of a single keyboard controller.

2. Description of the Related Art

Recent years have seen the development of the so-called laptop computer, which is basically a portable personal computer. Some models laptop are provided with a foldable flat panel type display, such as a plasma display, which, when the computer is not in use, can be folded down onto the main body, such that it covers the computer's integral keyboard. This feature, together with relatively light weight and compact dimensions, makes the device easy to carry around from place to place.

To further improve their portability, some recently-developed laptop computers employ a small integral keyboard. Since the number of keys provided in a smaller-size integral keyboard is generally less than that provided in a standard size keyboard, such as that used in a desk-top type personal computer, two or more functions therefore may be assigned to individual keys provided in the integral keyboard. However, assigning multiple functions to individual keys tends to render keyboard operation more complex. Thus, the smaller size integral keyboard tends to be inferior to the standard size keyboard, from the point of view of the keyboard operability.

With this in mind, several recently developed laptop computers have been designed so that an external keyboard having a larger number of keys than the integral keyboard can be optionally connected to them. When such an external keyboard is connected, the laptop type computer in question can be used in the same manner as the desk top type personal computer.

However, in order that both types of keyboards can be used, individual keyboard controllers -one for the integral keyboard and the other for the external keyboard- must be provided, thus increasing the number of parts or components required in the laptop computer, and increasing the manufacturing cost thereof.

SUMMARY OF THE INVENTION

Accordingly, an object of the present invention is to provide a computer wherein its integral keyboard and an optionally-connected external keyboard can both be controlled by means of a single keyboard controller.

To achieve this object, the present invention provides a computer which comprises: a main body; an integral keyboard formed in the main body; a data processing unit for performing various types of data processing; a connector for allowing connection of an external keyboard to the main body; a keyboard controller unit, controlled by the data processing unit, for receiving keyed-in data from the integral keyboard and transmitting it to the data processing unit; a selector for selecting either the integral keyboard or the connector, in accordance with a selection control signal, and connecting the selected unit to the keyboard controller unit; and a control signal supply unit for supplying the selection control signal to the selector.

In this computer, the selector connects the keyboard controller unit to either the integral keyboard or the connector. When the keyboard controller unit is connected to the integral keyboard, the operator can enter data using this keyboard, and when it is connected to the connector, the operator can enter data using the external keyboard connected to the connector. Since, therefore, both the integral keyboard and the external keyboard can be controlled by the same keyboard controller unit, it is possible to reduce the number of parts or components required in the computer, and thus reduce the manufacturing cost thereof.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
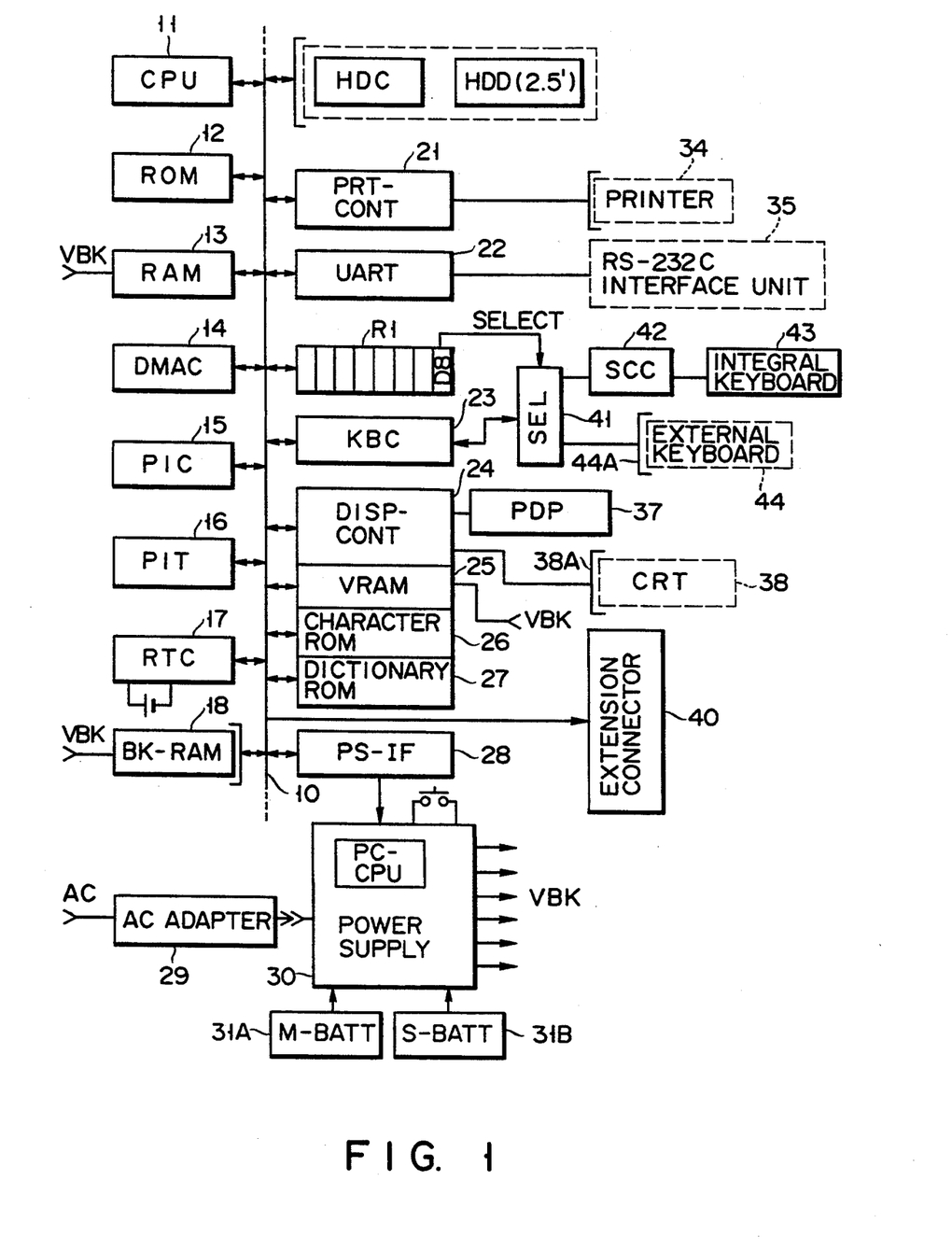
FIG. 1 is a schematic block circuit diagram showing the overall structure of a laptop type personal computer according to the first embodiment of the present invention.

A laptop type personal computer according to an embodiment of the present invention will now be described, with reference to FIG. 1. As is shown in FIG. 1, the laptop computer of the invention comprises a system bus 10; and the following structural components individually connected thereto: a CPU 11, a ROM 12, a RAM 13, a direct memory access controller (DMAC) 14, a programmable interrupt controller (PIC) 15, a programmable interval timer (PIT) 16, and a real time clock (RTC) 17.

The CPU 11 executes various type of data processing, and also has a function of determining which keyboard, —an integral keyboard 43 or an optionally-connectable external keyboard 44, —is to be used. The ROM 12 stores fixed programs which are necessary for the CPU 11 to execute various data processing operations, and fixed programs which are necessary for the CPU 11 to execute the processing required for selection of the keyboard to be used. The RAM 13 stores programs and data which are to be processed or updated, and has a storage capacity of, for example 1.5 Mbytes. Of this storage capacity, 640 Kbytes are used as a main memory, and 896 Kbytes as a so-called hard RAM. The storage area used as the hard RAM is supplied with power by a back-up power supply (VBK), when the main power supply is off.

The DMAC 14 performs control of direct memory accessing, the PIC 15 controls interrupt operations in accordance with the program set thereto, and the RTC 17 is a timepiece module which operates by means of its own battery.

In addition to the above structural components, the following components are also connected to the system bus 10: a back-up RAM 18, a printer controller (PRT-CONT) 21, a universal asynchronous receiver/transmitter (UART) 22, a control register R1, a keyboard controller (KBC) 23, a display controller (DISP-CONT) 24, a video RAM (VRAM) 25, a character ROM 26, and a dictionary ROM 27.

The back-up RAM 18 includes a data-storage area for achieving a resume function which is a function of beginning an operation again after interruption after main power supply is off, and is constantly supplied with power by the back-up power supply (VBK). The printer controller 21 controls a printer 34, the UART 22 functions as an input/output interface, and the keyboard controller 23 is connected to either the integral keyboard 43 or the external keyboard 44 through the selector (SEL) 41, and controls the keyboard connected thereto, under the control of the CPU 11. The control register R1 is an 8-bit type, and its eighth bit data D8 is supplied to the selector 41 as a select signal, so as to control the operation of the selector 41. In accordance with the select signal, the selector 41 connects the keyboard controller 23 to the integral keyboard through a scan controller (SCC) 42, or to the external keyboard 44, through a connector 44A. The scan controller 42 detects a depressed key by scanning the key matrix of the integral keyboard 43, and generates a key code corresponding to the depressed key. The external keyboard 44 incorporates a scan controller having a function similar to that mentioned above.

Under the control of the CPU 11, the display controller 24 controls a flat panel display, for example, plasma display 37 (which is also referred to as a plasma display panel [PDP]) and an optional CRT display 38 externally connected through a connector 38A. The video RAM (VRAM) 25 stores display data to be shown on the plasma display 37 or the CRT display 38. Since the video RAM 25 is constantly supplied with power by the back-up power supply (VBK), the display data is protected against being lost. The character ROM 26 stores data representing the dot patterns of various character fonts, which include kanji fonts (kanji: Chinese characters). The dictionary ROM 27 serves as a kana-kanji conversion table (kana: Japanese syllabic characters).

By use of either the integral keyboard 43 or the external keyboard 44, the operator first enters a Japanese word in kana and then pushes a kana-kanji conversion key provided on the keyboard. As a result, data which represents the kanji corresponding to the entered Japanese word is read out of the dictionary ROM 27.

A power supply-control interface (PS-IF) 28 is connected to the system bus 10, which connects a power supply circuit 30 to the CPU 11. An AC adapter 29 is a power supply type which rectifies and smooths commercial AC power so as to obtain DC operating power of predetermined voltage, and is plugged into the main body of the personal computer. The power supply circuit 30 includes a power control CPU (PC-CPU), under the control of which a check is carried out to determine whether or not each internal portion of the computer is powered, irrespective of the on/off state of the computer power source.

A removable type main battery (M-BATT) 31A and a built-in type sub battery (S-BATT) 31B are connected to the power supply circuit 30. Both batteries are chargeable.

The printer 34 can be connected to the printer controller 21, and an RS-232C interface unit 35 to the UART 22, when necessary. The integral keyboard 43 is formed in the main body of the computer, and is connected to the selector 41 through the scan controller 42. The external keyboard 44 is connected to the main body of the computer through the connector 44A, when necessary. The number of keys provided on the external keyboard 44 is greater than that provided on the integral keyboard 43.

The plasma display (PDP) 37 can be opened and closed in relation to the main body of the computer, and is connected to the display controller 24. The CRT display 38 can be externally connected to the display controller 24 through the connector 38A, when necessary. An extension connector 40 can be used for extension unit is connectable to the system bus of the computer.

Figure 2:
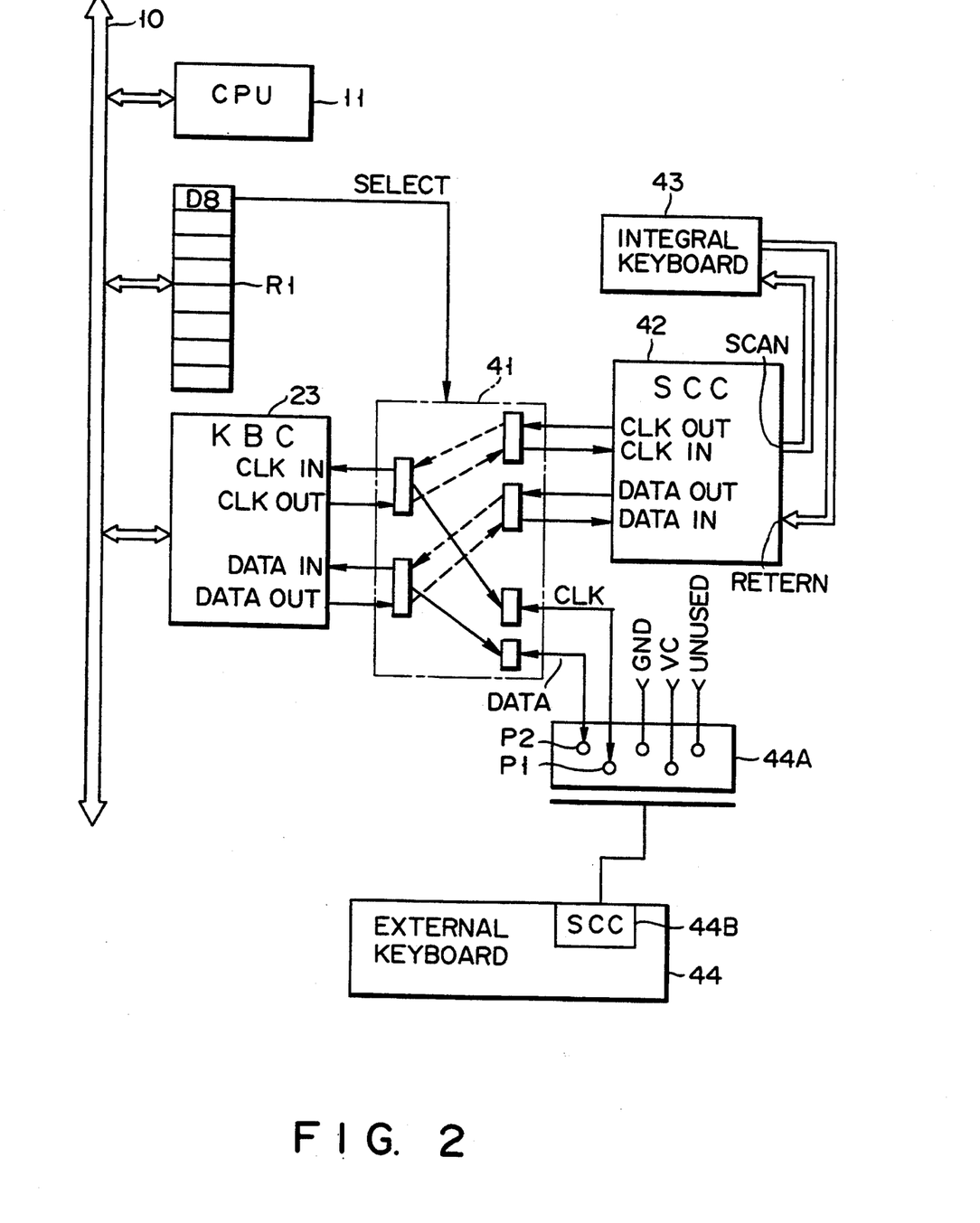
FIG. 2 is a conceptual block circuit diagram showing the structure of the selector employed in the computer shown in FIG. 1.

FIG. 2 is a block circuit diagram for explaining the operation of the selector 41.

As is shown in FIG. 2, the selector 41, which is provided at next stage of the keyboard controller 23, receives the eighth-bit data D8 of the control register R1 as a selection signal (SELECT). The states of the eighth-bit data D8 is determined by the CPU 11. In accordance with the states of this data DS, the selector 41 selects either the scan controller 42 or the connector 44A, and connects the keyboard controller 23 to the one selected.

In the case where the data D8 is set as "0", the selector 41 connects the keyboard controller 23 to the scan controller 42, to thereby render the integral keyboard 43 operative. In this case, the selector 41 enables serial communication of data between the keyboard controller 23 and the scan controller 42, by connecting the clock input and output terminals (CLK IN, CLK OUT) of the keyboard controller 23 to the clock output and input terminals (CLK OUT, CLK IN) of the scan controller 42, and by connecting the data input and output terminals (DATA IN, DATA OUT) of the keyboard controller 23 to the data output and input terminals (DATA OUT, DATA IN) of the scan controller 42, respectively. In this way, the selector 41 connects the keyboard controller 23 to the scan controller 42 corresponding to the integral keyboard 43. As a result, data can be supplied from the integral keyboard 43 to the computer when this integral keyboard 43 is operated. A data input operation by use of the integral keyboard 43 is carried out as described below.

First, the CPU 11 issues a key input data reception instruction to the keyboard controller 23. In response to this instruction, the keyboard controller 23 commands, via the selector 41, that the scan controller 42 read key input data. Accordingly, the scan controller 42 supplies the integral keyboard 43 with a scan signal, on the basis of which the key matrix of the integral keyboard 43 is scanned line by line. The scan controller 42 determines which key or keys are depressed, on the basis of a return signal supplied thereto from the keyboard 43, and converts the information representing the depressed keys into key codes which can be interpreted by the CPU 11, and transmits them as key input data to the keyboard controller 23. The keyboard controller 23 transmits the key input data to the CPU 11, which then identifies the data entered through the integral keyboard 43.

In the case where the data D8 is set as "1" the selector 41 connects the keyboard controller 23 to the connector 44A, to thereby render the external keyboard 44 operative. In this case, the selector 41 enables serial communication of data between the keyboard controller 23 and the built-in scan controller 44B of the external keyboard 44, by connecting the clock input and output terminals (CLK IN, CLK OUT) of the keyboard controller 23 to the clock input/output pin P1 of the connector 44A, and by connecting the data input and output terminals (DATA IN, DATA OUT) of the keyboard controller 23 to the data input/output pin P2 of the connector 44A. In this way, the selector 41 connects the keyboard controller 23 to the built-in scan controller 44A of the external keyboard 44. Therefore, data can be supplied from the external keyboard 44 to the computer when the external keyboard 44 is operated. A data input operation by use of the external keyboard 44 is carried out as described below.

First, the CPU 11 issues a key input data reception instruction to the keyboard controller 23. In response to this instruction, the keyboard controller 23 commands, through the selector 41 and the connector 44A, that the scan controller 44B read key input data. Accordingly, the scan controller 44B supplies the external keyboard 44 with a scan signal (not shown), on the basis of which the key matrix of the external keyboard 44 is scanned line by line. The scan controller 42 determines which key or keys are depressed, on the basis of a return signal (not shown) supplied from the external keyboard 44 to the scan controller 44B. The scan controller 44B converts the information representing the depressed keys into key codes which can be interpreted by the CPU 11, and transmits the key codes through the connector 44A and selector 41 to the keyboard controller 23 as key input data. The keyboard controller 23 transmits the key input data to the CPU 11. In this manner, the CPU 11 identifies the data entered from the external keyboard 44.

Figure 3:
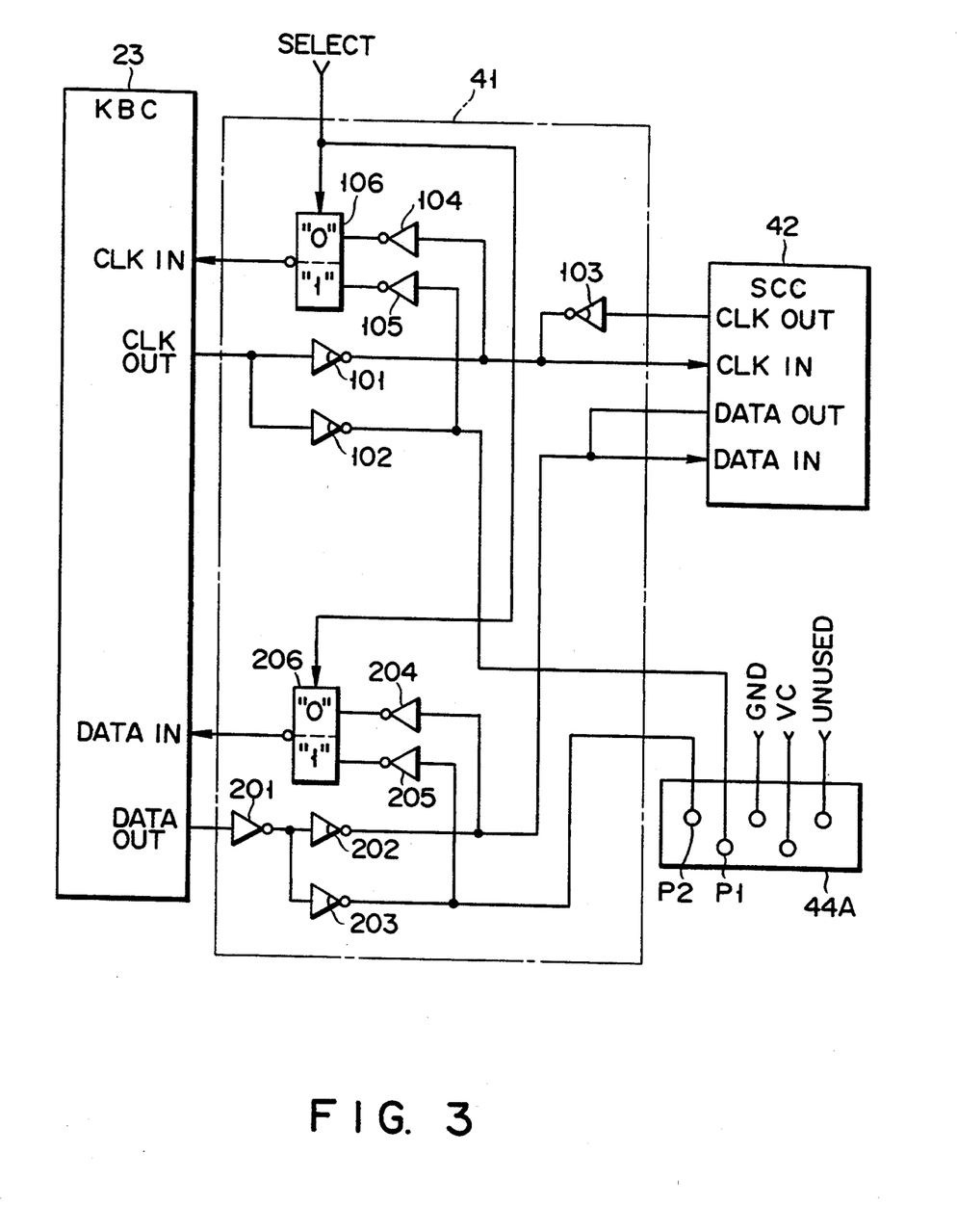
FIG. 3 is a circuit diagram showing one example of the structure of the selector.

FIG. 3 shows one example of the structure of the selector 41. Referring to this Figure, it can be seen that the selector 41 is made up of inverters 101–105 and 201–205 and selection circuits 106 and 206. Each of inverters 101, 102, 103, 202 and 203 has an open collector output. Therefore, output signals do not collide against each other and element destruction is prevented.

In the selector 41 shown in FIG. 3, a clock signal output from the clock output terminal (CLK OUT) of the keyboard controller 23 is supplied to the clock input terminal (CLK IN) of the scan controller 42 by way of inverter 101. It is also supplied to the clock input/output pin P1 of the connector 44A by way of inverter 102. A clock signal output from the clock output terminal (CLK OUT) of the scan controller 42 is supplied to the first input terminal of the selector circuit 106 by way of inverters 103 and 104. A clock signal output from the clock input/output terminal P1 of the connector 44A is supplied to the second input terminal of the selection circuit 106 by way of inverter 105. If a selection signal SELECT (i.e., data D8 of the control register R1 shown in FIG. 2) is at logical "0", the selection circuit 106 selects an output of inverter 104 and supplies it to the clock input terminal (CLK IN) of the keyboard controller 23. Conversely, if the selection signal SELECT is at logical "1", the selection circuit 106 selects an output of inverter 105 and supplies it to the clock input terminal (CLK IN) of the keyboard controller 23. In this manner, the clock input terminal (CLK IN) of the keyboard controller 23 receives the clock signal coming from either the scan controller 42 or the connector 44A.

Data output from the data output terminal (DATA OUT) of the keyboard controller 23 is supplied to the data input terminal (DATA IN) of the scan controller 42 by way of inverters 201 and 202. It is also supplied to the data input/output pin P2 of the connector 44A by way of inverters 201 and 203. Data output from the data output terminal (DATA OUT) of the scan controller 42 is supplied to the first input terminal of the selector circuit 206 by way of inverters 204. Data output from the data input/output terminal P2 of the connector 44A is supplied to the second input terminal of the selection circuit 206 by way of inverter 205. If a selection signal SELECT (i.e., data D8 of the control register R1 shown in FIG. 2) is at logical "0", the selection circuit 206 selects an output of inverter 204 and supplies it to the data input terminal (DATA IN) of the keyboard controller 23. Conversely, if the selection signal SELECT is at logical "1" the selection circuit 206 selects an output of inverter 205 and supplies it to the data input terminal (DATA IN) of the keyboard controller 23. In this manner, the data input terminal (DATA IN) of the keyboard controller 23 receives the data coming from either the scan controller 42 or the connector 44A.

With the selector 41 mentioned above, the keyboard controller 23 can supply its clock signal and data to both the scan controller 42 and the connector 44A. However, the selector 41 receives the clock signal and data coming from either the scan controller 42 or connector 44A. In this manner, either the communication between the keyboard controller 23 and the scan controller 42 or the communication between the keyboard controller 23 and the connector 44A is selectively carried out.

Figure 4:
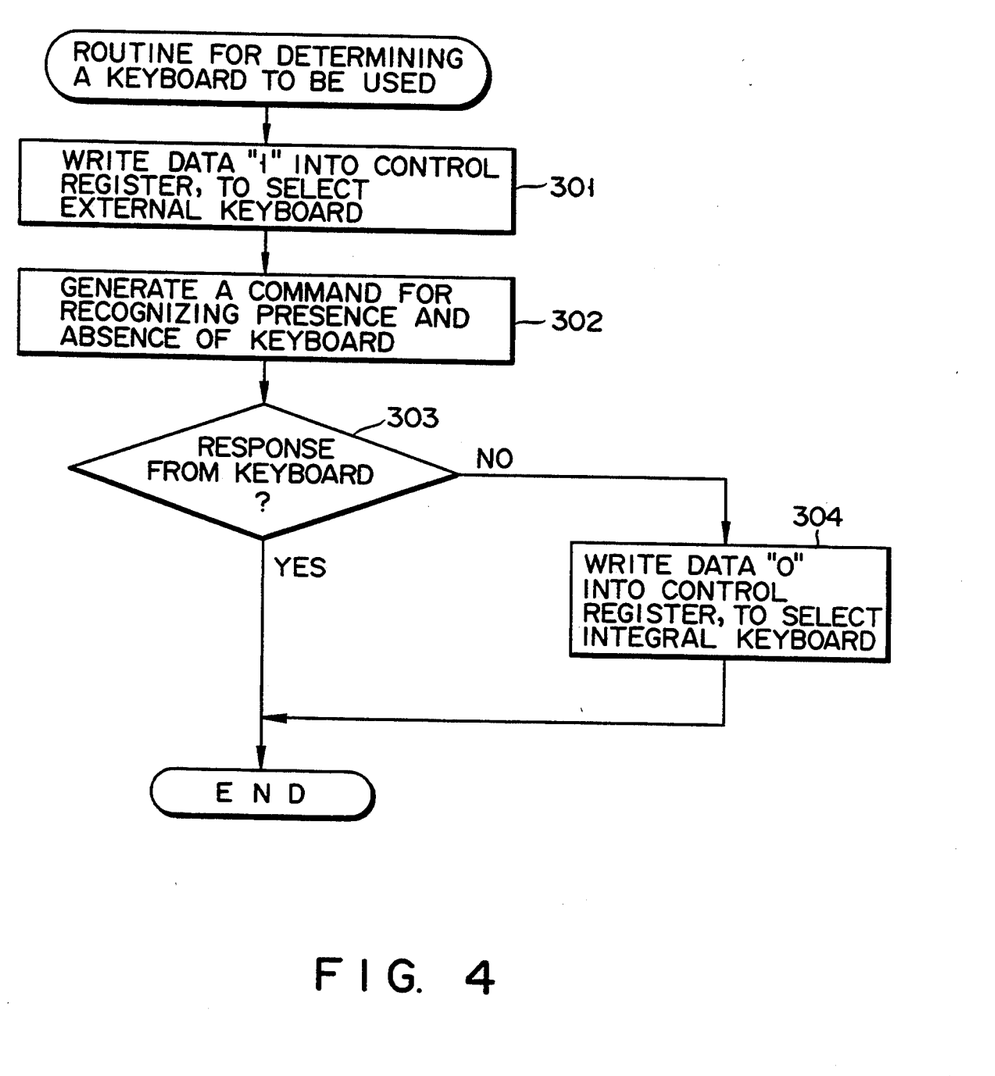
FIG. 4 is a flowchart showing one example of a process in which the computer executes keyboard selection processing.

Next, a description will be given as to how the CPU 11 renders a keyboard operative by use of the control register R1 and selector 41, with reference to the flowchart shown in FIG. 4. The flowchart shown in FIG. 4 is a routine by which it is determined whether or not the external keyboard 44 is connected to the connector 44A when the power supply of the computer is turned on. With the routine executed, the keyboard to be used is automatically rendered operative. If the external keyboard 44 is connected to the connector 44A when the computer is powered, the external keyboard 44 is rendered operative. If not, the integral keyboard 43 is rendered operative.

Referring to FIG. 4, step 301 is executed when the power source of the computer is turned on. In step 301, the CPU 11 writes data "1" with respect to the eighth-bit data stored in the control register R1. As a result, a select signal which is at logical "1" is supplied to the selector 41, and the selector 41 connects the keyboard controller 23 to the connector 44A. Next, step 302 is executed, wherein the CPU 11 supplies the keyboard controller 23 with a signal used for determining whether or not the external keyboard 44 is connected to the connector 44A. In response to this signal, the keyboard controller 23 supplies data to the connector 44A.

If the external keyboard 44 is connected to the connector 44A, a response signal, which the scan controller 44B of the external keyboard 23 produces in response to the data coming from the keyboard controller 23, is sent to the CPU 11 by way of the connector 44A, the selector 41, and the keyboard controller 23. If the external keyboard 44 is not connected to the connector 44A, the response signal is not sent to the CPU 11. Thus, step 303 is executed, wherein the CPU 11 determines whether or not a response signal is sent from the external keyboard 44 within the predetermined time. With the response signal detected within the predetermined time, the CPU 11 determines whether or not the external keyboard 44 is connected to the connector 44A at the time when the computer is powered.

If the response signal is not sent from the external keyboard 44 within the predetermined time, then the CPU 11 determines that the external keyboard 44 is not connected to the connector 44A. In order to render the integral keyboard 43 operative, therefore, step 304 is executed, wherein the CPU 11 writes data "0" with respect to the eighth-bit data stored in the control register R1. As a result, a select signal which is at logical "0" is supplied to the selector 41 and the selector 41 connects the keyboard controller 23 to the scan controller 42 corresponding to the integral keyboard 43. Thus, the keyboard 43 is made operative, and data can be entered by operating it.

If the response signal is sent from the external keyboard 44 within the predetermined time, then the CPU 11 determines that the external keyboard 44 is connected to the connector 44A. In this case, the routine shown in FIG. 4 is brought to an end, with the data "1" written in the control register R1 being kept as it is. From this time on, therefore, the external keyboard 44 is made operative, and data can be entered by operating the external keyboard 44.

Figure 5:
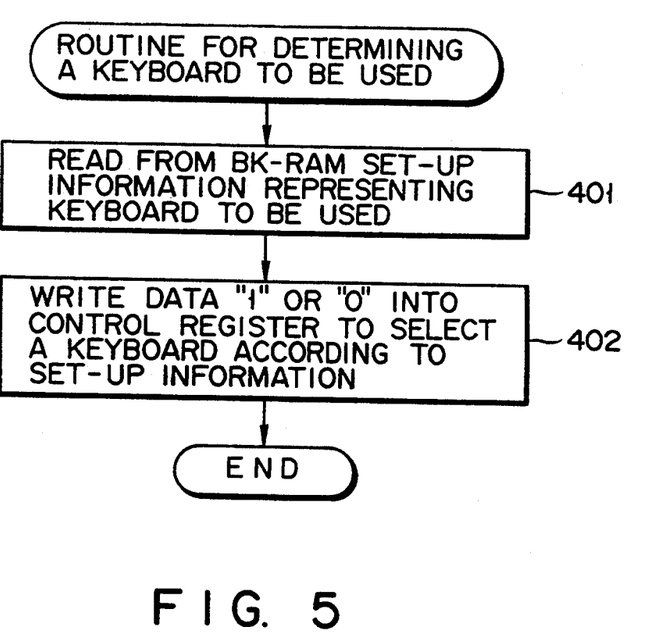
FIG. 5 is a flowchart showing another example of a process in which the computer executes the keyboard selection processing.

FIG. 5 is a flowchart showing an alternative process in which the CPU 11 selects a keyboard and renders it operative. According to the flowchart shown in FIG. 4, the keyboard to be used is automatically made operative by detecting whether or not the external keyboard 44 is connected to the connector 44A when the computer is powered. According to the flowchart shown in FIG. 5, in contrast, the keyboard to be used is made operative on the basis of keyboard selection information which the operator enters beforehand during setup processing. The setup processing is executed to determine hardware to be used, when the power supply of the computer is turned on or when the operator enters an execution command by key operation.

Referring to FIG. 5, step 401 is executed when the power supply is turned on. In this step 401, the setup information, which the operator enters previously in the setup processing, is read out of the back-up RAM 18. The setup information includes keyboard selection information representing a keyboard designated by the operator. After the execution of step 401, in step 402, the CPU 11 writes data corresponding to the keyboard designated by the keyboard selection information, with respect to the eighth-bit data of the control register R1. To be more specific, the CUP 11 writes data "1" if the external keyboard 44 is designated by the keyboard selection information, and writes data "0" if the integral keyboard 43 is designated. As a result, the selector 41 connects the keyboard controller 23 to either the connector 44A corresponding to the external keyboard 44 or the scan controller 42 corresponding to the integral keyboard 43.

The flowcharts shown in FIGS. 4 and 5 explain how the CPU 11 selects the keyboard to be used and makes it operative. Needless to say, however, the method by which keyboard to be used is selected and made operative is in no way limited to the procedures shown in FIGS. 4 and 5. For example, a hardware switch, such as a DIP (dual in-line package) switch, may be provided in the main body of the personal computer. In this case, the keyboard to be used is selected and made operative by turning the hardware switch on or off.

Figure 6:
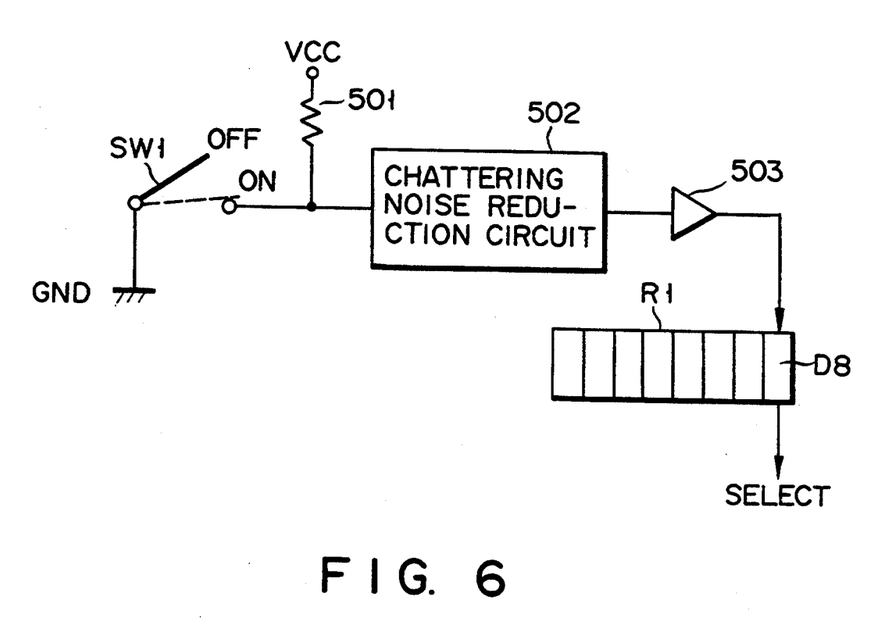
FIG. 6 is a circuit diagram showing an example circuit arrangement which allows the computer to execute the keyboard selection processing in response to the operating of a hardware switch.

FIG. 6 shows an example of a circuit which allows the computer to execute keyboard selection in response to the operating of the hardware switch mentioned above. The circuit shown in FIG. 6 is made up of: a resistor 501 and a hardware switch SW1, which are connected in series between a power supply terminal VCC and a grounded terminal GND; a chattering noise reduction circuit 502; and a buffer 503. If the hardware switch SW1 is set at the OFF position indicated by the solid line in FIG. 6, a high-level output is produced from the buffer 503, so that data "1" is written with respect to the eighth-bit data of the register R1. As a result, a logical "1" selection signal SELECT is supplied from the register R1 to the selector 41, for the selection of the external keyboard 44. If the hardware switch SW1 is set at the ON position indicated by the broken line in FIG. 6, a low-level output is produced from the buffer 503, so that data "0" is written with respect to the eighth-bit data of the register R1. As a result, a logical "0" selection signal SELECT is supplied from the register R1 to the selector 41, for the selection of the integral keyboard 43.

Figure 7:
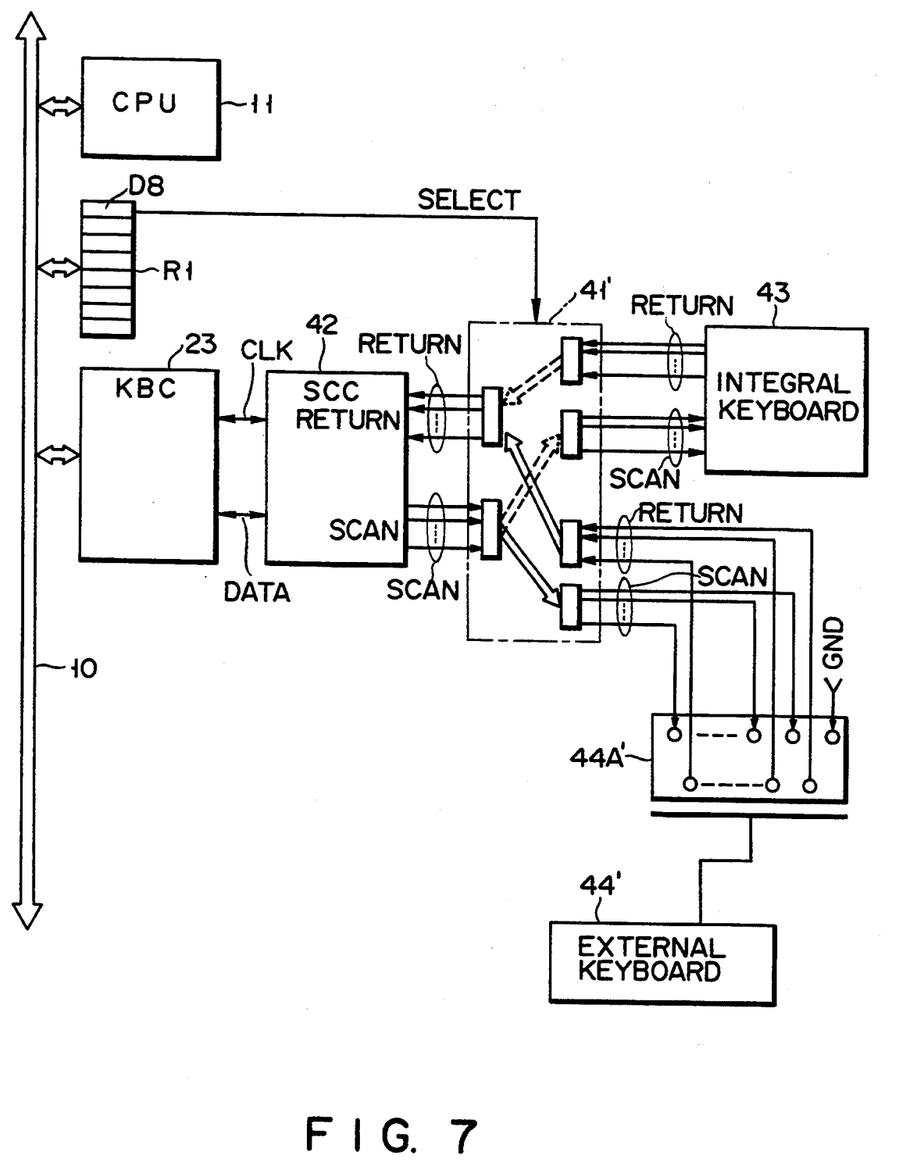
FIG. 7 is a conceptual block circuit diagram showing a modification of the selector employed in the computer.

FIG. 7 shows a modification of the personal computer of the present invention. In this modification, a selector 41' provided at a next stage of the scan controller 42 is employed, in place of the above-mentioned selector 41 provided at a next stage of the keyboard controller 23. In addition, a connector 44A' having twenty-two pins is employed, in place of the abovementioned connector 44A having only five pins. Further, an external keyboard 44' incorporating no scan controlled is employed, in place of the above-mentioned external keyboard 44 incorporating the scan controller 44B.

In the personal computer of the modification, the selector 41' receives the eighth-bit data D8 of the control register R1 as a selection signal SELECT. In accordance with this selection signal SELECT, the selector 41' connects the scan controller 42 to either the integral keyboard 43 or the connector 44A'.

In the case where the data D8 is set at "0" by the CPU 11, the selector 41' connects the scan controller 42 to the integral keyboard 43, to thereby make the integral keyboard 43 operative. As is indicated by the broken lines, the selector 41' allows a 13-bit scan signal, which the scan controller 42 outputs, to be supplied to the integral keyboard 43, and allows an 8-bit return signal, which the keyboard 43 outputs in response to the scan signal, to be supplied to the scan controller 42. In this manner, the selector 41' establishes connection between the scan controller 42 and the integral keyboard 43, so that the operator can enter data by operating this keyboard.

In the case where the data D8 is set at "1" by the CPU 11, the selector 41' connects the scan controller 42 to the connector 44A', to thereby make the external keyboard 44' operative. As is indicated by the solid lines, the selector 41' allows the 13-bit scan signal to be supplied from the scan controller 42 to the external keyboard 44' through the connector 44A', and allows the 8-bit return signal to be supplied from the external keyboard 44' to the scan controller 42 through the connector 44 A'. In this manner, the selector 41' establishes connection between the scan controller 42 and the external keyboard 44', SO that the operator can enter data by operating the external keyboard 44'.

In the arrangement shown in FIG. 7, a keyboard to be used can be selected and made operative by permitting the CPU 11 to execute the routine shown in FIG. 4 or 5, as in the arrangement shown in FIG. 2. In the case where the routine shown in FIG. 4 is used, however, it should be noted that whether or not the external keyboard 44' is connected to the connector 44A' is determined on the basis of the presence or absence of a return signal coming from the external keyboard 44', not of a response signal coming from the scan controller 42.

In comparison with the FIG. 2 arrangement (wherein the selector 41 is provided at a next stage of the keyboard controller 23), the FIG. 7 arrangement (wherein the selector 41' is provided at a next stage of the scan controller 42) is disadvantageous, in that the number of signal lines to be switched by the selector 41' - and the number of pins provided for the connector 44A' - are both large. In the FIG. 7 arrangement, however, not only the keyboard controller 23 but also the scan controller 42 can be used in common to both the integral keyboard 43 and the external keyboard 44'. Moreover, the external keyboard 44' need not incorporate a scan controller. Because of these advantages, the overall manufacturing cost of the system can be reduced.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A portable computer system comprising:
   a main body having a central processing unit, a system bus, an external keyboard connector, and a built-in keyboard;
   an external keyboard of a type different from said built-in keyboard, removably connected to the main body through the external keyboard connector;
   a keyboard controller included in the main body, having a system bus interface connected to the system bus to send/receive data to/from the central processing unit, and a keyboard interface for sending/receiving signals to/from one of the built-in and the external keyboards, and capable of receiving keyed-in data from one of the built-in and the external keyboards and for transmitting the keyed-in data received to the central processing unit; and
   a selecting circuit, included in the main body and connected to said keyboard interface, said built-in keyboard, and said external keyboard connector, for connecting said keyboard interface to one of said built-in and said external keyboards through said external keyboard connector.

2. A portable computer system according to claim 1, wherein said computer system further comprises control signal supply means for supplying a selection control signal to the selecting circuit, said control signal supply means includes a register which stores data which is supplied to said selecting circuit as the selection control signal, and said selecting circuit selects one of the keyboards in accordance with the selection control signal.

3. A portable computer system according to claim 2, wherein said central processing unit detects whether or not the external keyboard is connected to the main body, said central processing unit writes first data in the register, to thereby cause the selecting circuit to select the external keyboard, when the central processing unit detects that the external keyboard is connected to the main body, and writes second data in the register, to thereby cause the selecting circuit to select the built-in keyboard, when the central processing unit detects that the external keyboard is disconnected from the main body.

4. A portable computer system according to claim 2, further comprising information storage means for storing keyboard-designation information which is entered by an operator, said central processing unit determining the contents of the data stored in the register, on the basis of the keyboard-designation information stored in the information storage means.

5. A portable computer system according to claim 2, further comprising a hardware switch to be turned on or off by an operator, the contents of the data stored in said register being determined depending upon the ON/OFF state of the hardware switch.

6. A portable computer system according to claim 1, further comprising a first scan controller, connected between the selecting circuit and the built-in keyboard, said first scan controller detecting a depressed key of the built-in keyboard by scanning a key matrix of the built-in keyboard, and generating key code data corresponding to the depressed key.

7. A portable computer system according to claim 6, wherein said external keyboard includes a second scan controller which detects a depressed key of the external keyboard by scanning a key matrix of the external keyboard, and generates key code data corresponding to the depressed key.

8. A portable computer system according to claim 1, further comprising scan controller connected between the interface of the keyboard controller and the selecting circuit, said scan controller detecting a depressed key of one of the built-in and external keyboards by scanning a key matrix, and generating key code data corresponding to the depressed key.

9. A portable computer which an external keyboard can be removably connected, the portable computer comprising:
   a housing including a central processing unit (CPU), a connector removably and electrically connected to the external keyboard, and a bus electrically connected to the CPU;

a built-in data input means for inputting data, wherein the built-in data input means is located in the housing and is different in type from the external keyboard;

a controller located in the housing including first and second interfaces, the first interface being electrically connected to the bus, wherein the first interface communicates with the CPU and the second interface receives signals from one of the built-in data input means and the external keyboards; and a selector located in the housing and connected to the second interface, the built-in data input means, and the connector, wherein the selector connects the second interface to one of the built-in data input means and the eternal keyboard through the connector.

10. A portable computer according to claim 9, wherein the housing includes control signal supplying means for supplying a selection control signal to the selector, and the selector selects one of the built-in data input means and the external keyboard in accordance with the selection control signal.

11. A portable computer according to claim 9, wherein the housing includes a register which stores selection data from selecting one of the built-in data input means and the external keyboard, and the selector selects one of the built-in data input means and the external keyboard in accordance with the selection data.

12. A portable computer according to claim 11, wherein the housing includes control means for detecting whether or not the external keyboard is connected to the connector, the control means writes a first data in the register when the control means detects that the external keyboard is connected to the connector, the control means writes a second data in the register when the control means detects that the external keyboard is not connected to the connector, and the selector selects the external keyboard when the first data is written in the register and selects the built-in data input means when the second data is written in the register.

13. A portable computer according to claim 12, wherein the housing includes data storage means for storing designating data entered by an operator, and the control means writes one of the first and the second data in the register in accordance with the designating data.

14. A portable computer according to claim 11, wherein the housing includes a switch which is movable between a first position and a second position, wherein a first data for selecting the external keyboard by the selector is written in the register when the switch is at the first position and a second data for selecting the built-in data input means is written the register.

15. A portable computer according to claim 9, wherein the built-in data input means is an internal keyboard having a plurality of key-tops.

16. A portable computer to which an external keyboard can be removably connected, the portable computer comprising:

a housing including a central processing unit (CPU), a connector removably and electrically connected to the external keyboard, and a bus electrically connected to the CPU;

a built-in data input means for inputting data, wherein the built-in data input means is located in the housing and is different in type from the external keyboard; and a controller circuit, including a keyboard control circuit and a selector circuit, located in the housing, wherein the keyboard control circuit has a first interface electrically connected to the bus to communicate with the CPU and a second interface to receive signals from one of the built-i data input means and the external keyboard, and the keyboard control circuit receives signals when the external keyboard is electrically connected to the connector, and wherein the selector circuit is connected to the second interface, the built-in data input means, and the connector, and the selector circuit connects the second interface to one of the built-in data input means and the external keyboard through the connector.

17. A portable computer according to claim 16, wherein the housing includes a register which stores selection data from selecting one of the built-in data input means and the external keyboard, and the selector circuit selects one of the built-in data input means and the external keyboard in accordance with the selection data.

18. A portable computer according to claim 17, wherein the housing includes control means for detecting whether or not the external keyboard is connected to the connector, the control means writes a first data in the register when the control means detects that the external keyboard is connected to the connector, the control means detects the external keyboard is not connected to the connector, the selector circuit selects the external keyboard when the first data is written in the register, and selects the built-in data input means when the second data is written in the register.

19. A portable computer according to claim 18, wherein the housing includes data storage means for storing designating data entered by an operator, and the control means writes one of the first and the second data in the register in accordance with the designating data.

20. A portable computer according to claim 17, wherein the housing includes a switch movable between a first position and a second position, wherein a first data for selecting the external keyboard by the selector is written in the register when the switch is at the first position, and a second data for selecting the built-in data input means by the selector is written in the register.

* * * * *